July 24, 1956 W. J. RYAN 2,755,683
AUTOMATIC POWER TRANSMISSION
Filed Sept. 26, 1951 5 Sheets-Sheet 3

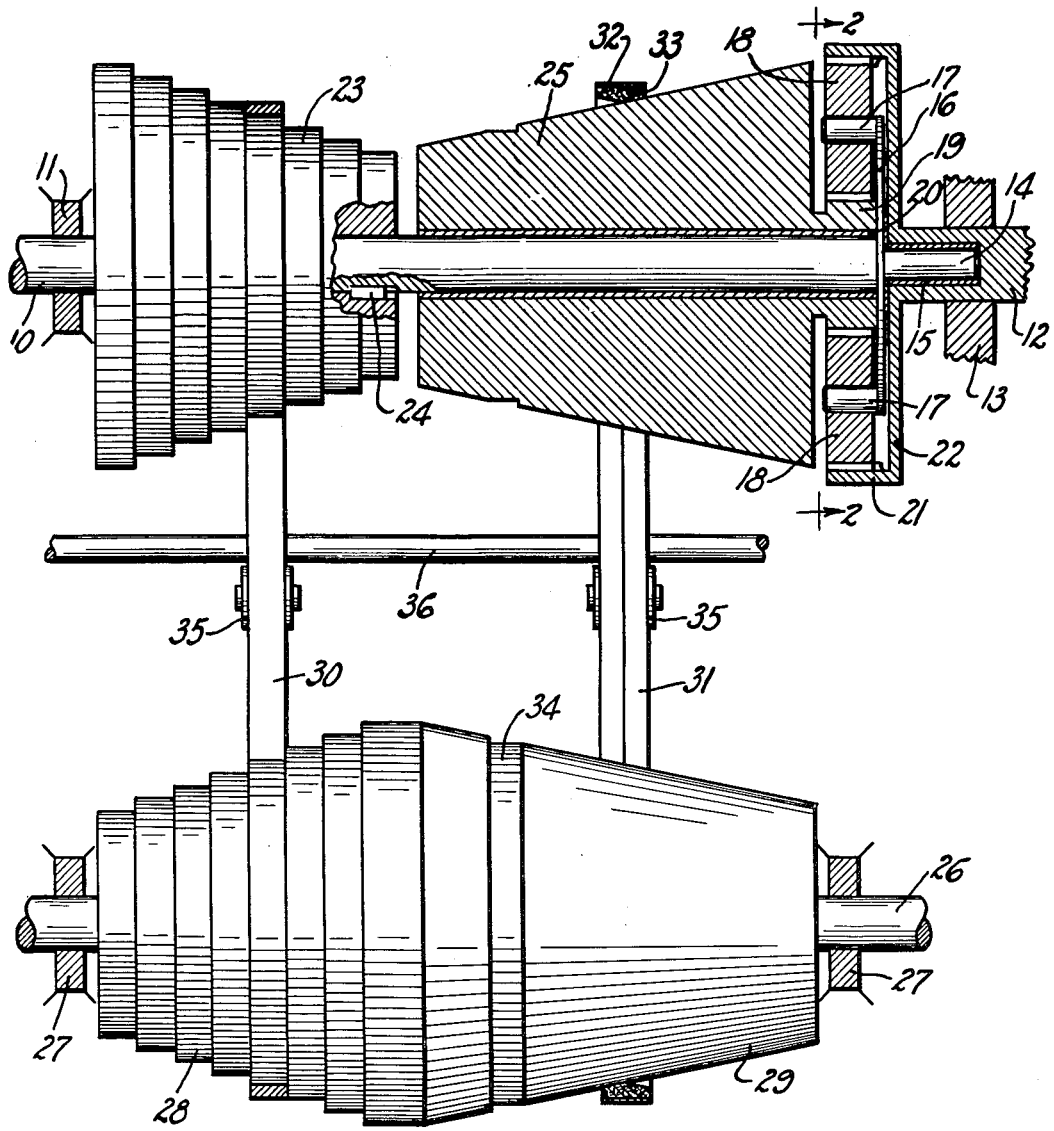

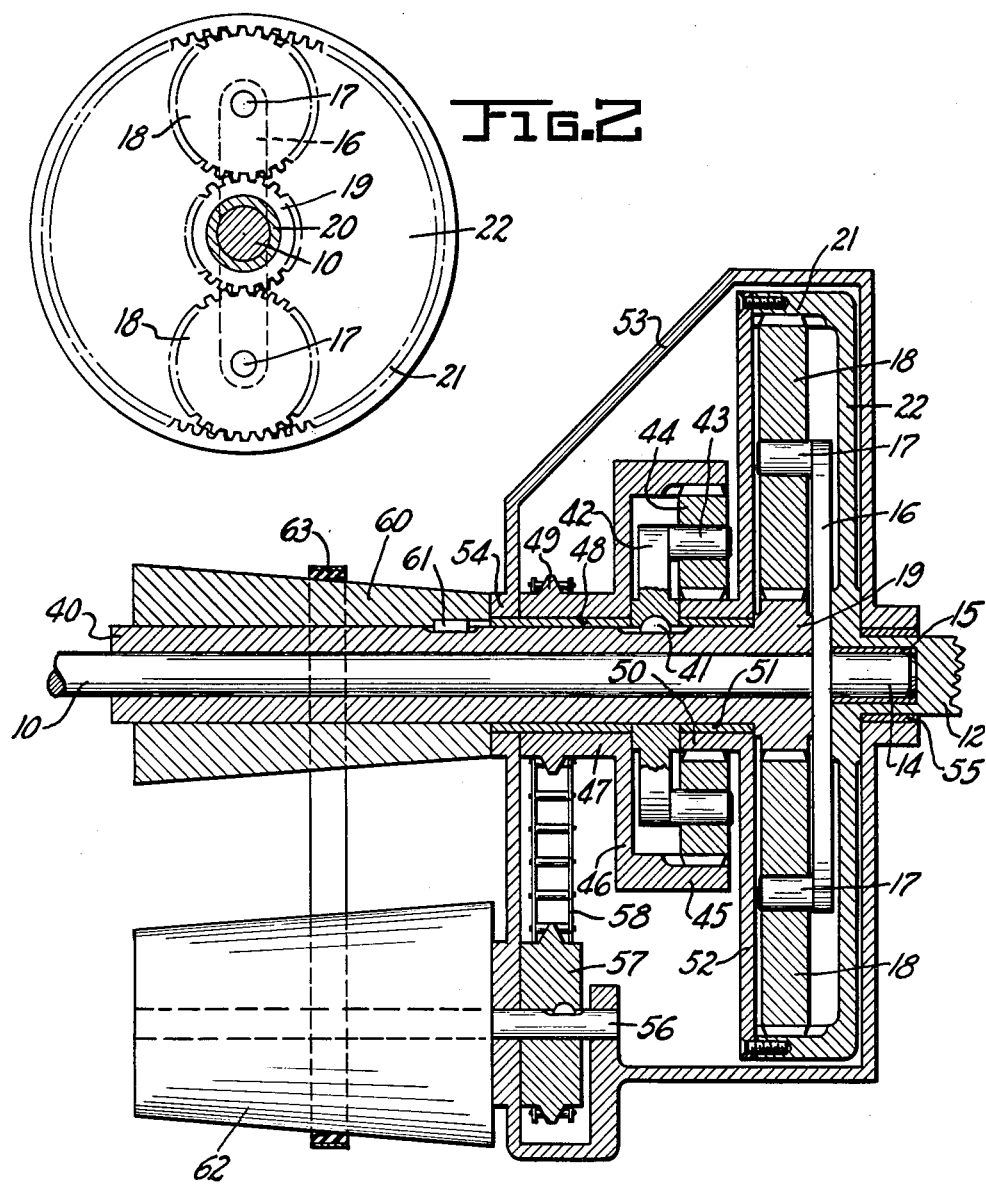

INVENTOR.
WILLIAM J. RYAN
BY
Oltsch & Knoblock
ATTORNEYS

July 24, 1956 W. J. RYAN 2,755,683
AUTOMATIC POWER TRANSMISSION
Filed Sept. 26, 1951 5 Sheets-Sheet 4

INVENTOR.
WILLIAM J. RYAN.
BY
Oltsch & Knoblock,
ATTORNEYS

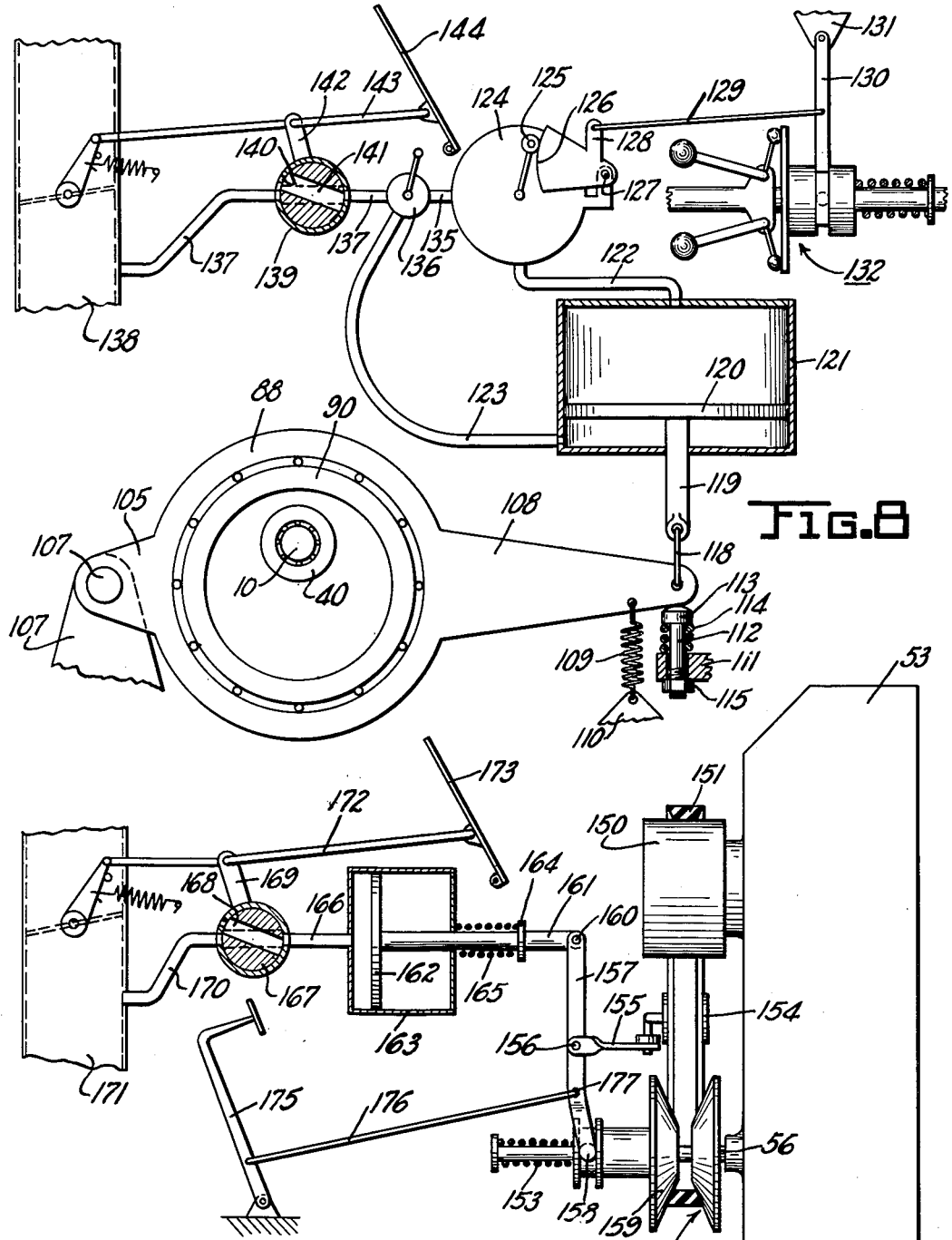

United States Patent Office 2,755,683
Patented July 24, 1956

2,755,683

AUTOMATIC POWER TRANSMISSION

William J. Ryan, Muskegon, Mich.

Application September 26, 1951, Serial No. 248,315

13 Claims. (Cl. 74—472)

This invention relates to improvements in an automatic power transmission, and more particularly to a reaction controlled, progressively variable speed controlling automatic power transmission which is particularly well suited for use in automotive vehicles.

The primary object of the device is to provide a complete range of variable output speeds from neutral to direct drive and to provide for reverse drive, and also to provide backlash decelerating speed ratios.

Another object of the invention is to provide a device of this character which utilizes a planetary differential gearing system in which a planet gear carrier constitutes a driving member, an outer gear constitutes the driven or output gear, and an inner sun gear comprises a torque reaction member and is associated with a speed selecting device.

A further object of the invention is to provide a device of the planetary gear type which utilizes planetary equalizing gears of the gearing to reduce torque reaction pressure toward a sun gear at the center of the planetary system so that high velocity motion of low torque-transmitting value applied at said sun gear will control output speed of the device.

A further object of the invention is to provide a planetary type transmission device wherein a reaction-controlling sun gear is located at the center of the planetary system where it can be small enough to have great leverage and more revolutions than the output member, and wherein said reaction gear is located to revolve about the drive shaft of the device in the same direction as said drive shaft so that it can be conveniently controlled in the full range from neutral setting to a direct drive setting.

A further object of the invention is to provide a device of the planetary gear type, wherein variable speeds can be directed to the output member by resisting the movement of the reaction sun gear. For example, in this device, when the reaction gear is operated at the same speed as the drive member, all of the gearing will be in direct drive; when the reaction gear is allowed to revolve at a certain speed above the speed of the drive shaft, the transmission will be in neutral; when the reaction gear is driven faster than its speed for neutral setting, the transmission will be in reverse; and, when the reaction gear is held at a speed slower than that of the drive shaft, the transmission will be an overdrive.

A further object is to provide a transmission device having an epicyclic gearing, wherein a reaction gear has a multiplying leverage through planetary gearing in allowing a drive member to overrun a driven member so that in the very low speed range, as when starting a load, the torque applied to the reaction member will be small, but will increase progressively as operation of the transmission progressively absorbs the starting load until the transmission reaches direct drive, and wherein the planet gearing will continue to take a portion of the torque reaction pressure when the device is in direct drive.

A further object is to provide a transmission device having a planetary gearing, wherein the peripheral dimension of the sun gear which controls torque reaction is small compared to the output gear, so that the reaction controlling sun gear will have a corresponding leverage which acts in the device with the reduction offered by the equalizer or planet gears to reduce reaction torque at the sun gear to a small fraction of that applied to the output gear while in direct drive, whereby the torque reaction may be taken effectively by a variable speed mechanism of a type capable of transmitting only a small torque compared to the torque required at the output member.

A further object is to provide a device of this character having a primary planetary gearing system and a secondary planetary gearing system in which a planet gear carrier of the secondary system is directly connected to a torque reaction gear of the primary system, the output gear of the primary system is connected to the sun gear of the secondary system, and the outer gear of the secondary system and the torque reaction gear of the primary system are interconnected by a variable speed control device, and in which the parts are so related that the range of variability required in the speed control device is small.

A further object of the invention is to provide a device of this character having a novel friction drive, variable speed control mechanism.

Another object of the invention is to provide a transmission having an automatic control sensitive to the response of an engine to a load, and particularly to engine manifold vacuum while the engine is under load for adjusting the transmission to select the proper speed ratio between a driving shaft and a driven shaft.

A further object of the invention is to provide a transmission which will normally operate in a direct drive or overdrive relation at both fast and slow vehicle speeds and at all times except when the vehicle is starting or is subjected to a heavy pull, as when accelerating rapidly or when climbing a steep grade.

Other objects will be apparent from the following specification.

In the drawings:

Fig. 1 is a side view, partly in section, illustrating one embodiment of my invention.

Fig. 2 is a transverse sectional view taken on line 2—2 of Fig. 1.

Fig. 3 is an axial sectional view of another embodiment of my invention.

Fig. 8 is a view illustrating the manner in which the device illustrated in Figs. 5 to 7, inclusive, may be connected to other parts of an automotive vehicle for automatic control thereof.

Fig. 9 is a view illustrating another embodiment of the invention having a novel speed varying device and a novel connection with operating parts of an automotive vehicle for control thereby.

Figure 5:
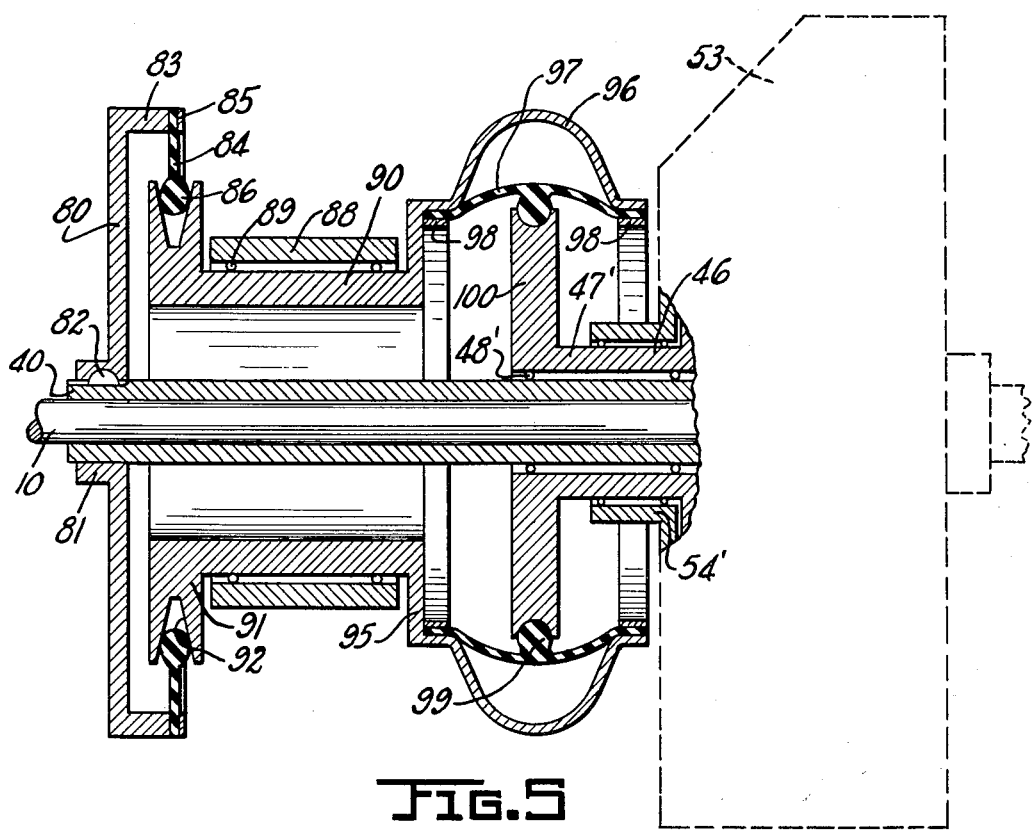
Fig. 5 is an axial sectional view of a speed control device forming a modified embodiment of my invention.

Referring to the drawings, and particularly to Figs. 1 and 2 which illustrate one embodiment of the invention, the numeral 10 designates a drive shaft journaled in a bearing member 11, and the numeral 12 designates a driven shaft journaled in the bearing member 13. The shafts 10 and 12 are axially aligned and a reduced diameter portion 14 of the driving shaft may project into a bearing sleeve 15 received in an axial socket in one end of the driven shaft 12. The driving shaft 10 mounts a planet carrier 16 adjacent to the reduced end portion 14 thereof. This carrier 16 is illustrated in Fig. 2 as constituting a cross-arm whose opposite ends mount spindles or stud shafts 17. It will be understood, however, that the carrier 16 may assume any form and that one, or more than two, stud shafts 17 may be provided. When there are multiple shafts 17, they are equally spaced from and parallel to the shaft 10 and also equally spaced from one another. Each stud shaft 17 mounts a planetary spur gear 18.

A sun gear 19 concentrically encircles the shaft 10 and is journaled thereon as by means of a bearing sleeve 20. The sun gear 19 meshes with each of the planet gears 18. An outer internally toothed ring gear 21 is positioned concentric with the sun gear 19 and in mesh with the planet gears 18. The outer gear 21 is carried by a spider or yoke 22 which is fixedly secured adjacent its center to the driven shaft 12. The gears 18, 19 and 21 constitute an epicyclic or planetary gear system.

The operation of the epicyclic system for the purpose of transmitting torque and rotation from the driving shaft 10 to the driven shaft 12 depends upon the control of torque reaction within this planetary gearing system. This control must be capable of a progressive variation of output speed to be effective to control the operation of the vehicle from a starting position, in which no torque is transmitted from shaft 10 to shaft 12, up to and through a direct drive in which shafts 10 and 12 are driven at the same rate and including an overdrive adjustment in which the shaft 12 may be driven at a speed greater than the shaft 10.

Various types of variable speed mechanisms may be employed for this purpose, and in Fig. 1 I have illustrated a cone pulley type of variable speed mechanism. In this mechanism a cone pulley 23, here shown as being of the step type, is keyed to the driving shaft 10 at 24. A second cone pulley 25, here illustrated as being smoothly tapered, is journaled upon the drive shaft 10 by the journal sleeve 20 or other journal means. A counter-shaft 26 is journaled in suitable bearing supports 27 to extend parallel to the shaft 10 and preferably mount thereon a double pulley, including a step cone pulley portion 28 adjacent to the step cone pulley 23 and a smoothly tapered cone pulley portion 29 adjacent to the cone pulley portion 25. A belt 30 extends around and establishes a driving connection between the pulleys 23 and 28, and a pulley 31 establishes a driving connection between the pulleys 25 and 29. As here illustrated the belt 30 is a plain flat belt, and the belt 31 is of special configuration. Thus the belt 31 preferably includes a flexible metal band or backing 32 having a resilient inner facing layer 33. The layer 33 is preferably internally contoured by diverging faces to provide a central longitudinal portion of maximum thickness and side portions of progressively tapering and reduced thickness. The pulleys 25 and 29 will preferably each include a stepped or notched portion 34, which are aligned with each other so that the belt 31 will simultaneously engage said shoulder portions.

Suitable spring tensioned belt tightening idlers 35 engage the two belts 30 and 31 and are associated with belt shifting means (not shown) which include one or more shafts 36 extending parallel to the shafts 10 and 26 for guiding the belt shifting means. The belt shifting means will serve to vary the speed at which the pulleys rotate relative to each other.

In the operation of the device the shaft 10 rotates the planet carrier 16 to bodily shift said stud shafts 17 and the planet gears 18. The reaction of this rotation at the small diameter centrally positioned sun gear 19 affords substantial leverage at the sun gear 19 and reduces the torque reaction pressure occurring at said sun gear compared to the applied torque. In other words, there is a tendency in the device for the planetary gears to equalize the torque reaction and to divide it between the inner sun gear 19 and the outer ring gear 21. It will be apparent, however, that the reduction of the torque reaction at the sun gear has been accompanied by a multiplication of the speed of rotation of that sun gear compared to the speed of rotation of the drive shaft 10. The high speed of the sun gear necessitates a wide range of variability in the variable control for the epicyclic gearing and is accompanied by an overrunning of the drive member with reference to the output ring gear member 21. The increase in the speed of the sun gear compared to the speed of the drive shaft will depend principally upon the ratio of the dimensions of the toothed peripheries of the sun gear 19 and the output ring gear 21. The leverage action provided at the sun gear will be substantially comparable or equal to the size ratio.

In the operation of the device, when the same is in neutral or non-driving position, the reaction control sun gear is allowed through the speed reduction means to rotate at a speed sufficiently high to compensate for the gear ratio between the output shaft and the sun gear. Thus, if the periphery of the ring gear is three times the periphery of the sun gear, the sun gear must rotate four times for each one revolution of the drive shaft. The control mechanism will preferably have a position or setting at which such speed ratio or neutral setting can be determined readily, and, in the construction illustrated in Fig. 1, this effect is produced by the grooves or steps 34 in the cone pulleys when engaged by the belt 31. The engagement of the belt 31 with the steps 34 is intended to be readily ascertainable by the operator, due to the neutral tendency of the belt 31 to dwell upon the steps 34.

Reverse drive is achieved in the construction here illustrated by moving the belt shifter to the left from the neutral dwell steps 34 to rotate the sun gear at a speed faster than its speed at neutral setting. It will be apparent that the speed of reverse drive of the output shaft 12 will depend upon and vary in proportion to the increase of speed setting of the variable speed control mechanism compared to its speed at neutral setting.

When the belt shifting mechanism is in the adjustment illustrated, with the belt 31 at the right of the neutral dwell shoulders 34 as illustrated in Fig. 1, the device will be in a positive driving relation and the speed of drive reaction at the output shaft will depend upon the adjustment of the belts on the belt drive or speed control. When the reaction control gear is held by the speed control mechanism to rotate at the same speed as that at which the drive shaft 10 rotates, all of the gearing will come into a direct drive, that is, the sun gear 19, the planet carrier 16 and the output ring gear 21 will all revolve the same number of revolutions per minute. If the speed ratio is changed to such an extent that the speed of rotation of the sun gear is controlled through the variable speed control mechanism to a speed which is less than the speed of the planet carrier, then the device will operate in overdrive. In order to accomplish these various adjustments, it will be apparent that a wide range of variation of speed output must be available in the speed control mechanism employed.

It will be observed that the sun gear revolves about the driving shaft 10 in the same direction as the drive shaft rotates, thus simplifying the control of its speed through the variable speed control mechanism. The device also provides a satisfactory variable control of such character that the speed control and the epicyclic gearing may come into direct drive ratio at the same time.

Another characteristic of the device is that only a small amount of torque need be taken by the variable speed control mechanism compared to the driving torque applied to the driving shaft. Thus in the example stated, three-to-one leverage is effective to resist the divided or reduced torque reaction pressure at the same gear, and, consequently, only about sixteen percent of the effective total applied torque must be sustained by the variable speed mechanism. Observe also that the small size of the reaction controlling sun gear 19 and its location at the center of the epicyclic gearing enables a small change in its peripheral speed to effect a substantial change in the speed of the output member. It is this wide difference in speed which necessitates the wide range of speed adjustment in the speed control mechanism and also the adjustment of that mechanism through small increments.

Figure 4:
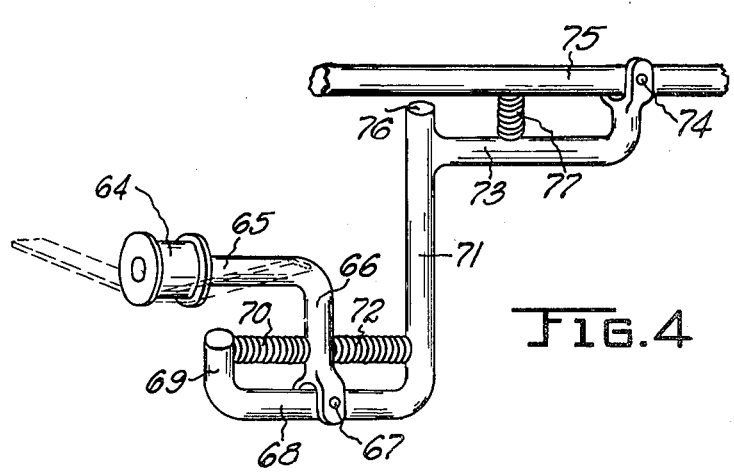
Fig. 4 is a detail view of a belt shifting mechanism utilized with the devices illustrated in Figs. 1 and 3.

Another embodiment of the invention is illustrated in Figs. 3 and 4. In this embodiment of the invention a secondary planetary or epicyclic gear system is associated with the first planetary or epicyclic system and the speed control means in such a manner as to greatly reduce the range of speed variation necessary in the variable speed control mechanism without increasing the torque reaction pressure applied to that variable speed control mechanism. In this embodiment of the invention, parts similar to those disclosed in the embodiment of Fig. 1 bear the same reference numerals. In this instance the drive shaft 10 mounts the planetary carrier 16 with its stud shafts or spindles 17 which journal the planet gears 18. An output ring gear 21 is connected by means of a spider or yoke 22 with the driven shaft 12. A sun gear 19 rotatably encircles and is journaled upon the drive shaft 10, and the planet gears 18 each mesh with the sun gear 19 and the output ring gear 21. The drive shaft 10 includes a forwardly projecting pilot portion 14 which is journaled in a bearing sleeve 15 received in a recess in the end of the driven shaft 12.

The sun gear 19 has an elongated hub or sleeve portion 40 journaled on the shaft 10. To this hub portion 40 is keyed at 41 a planet carrier 42 of a secondary planetary or epicyclic gear system. This planet carrier 42 includes one or more stud shafts 43, each of which rotatably supports a secondary planet gear 44. An internally toothed secondary ring gear 45 encircles the sleeve 40 and shaft 10 concentrically therewith and meshes with the secondary planet gear or gears 44. This secondary ring gear 45 is carried by a spider 46 or the like, mounted upon a hub 47 which is journaled as by bearing 48 upon the sleeve 40. The hub 47 preferably includes a toothed or sprocket portion 49. The secondary epicyclic gearing system includes a sun gear member 50 journaled upon the sleeve 40 as by a bearing 51 and meshing with the secondary planet gear or gears 44. A plate or spider 52 connects the secondary sun gear 50 with the primary output ring gear 21.

The gearing is preferably encased within a housing 53 from which the sleeve 40 projects rotatably as through a bearing or journal 54. The housing 53 also includes a journal portion 55 in which the output shaft 12 is journaled and through which said output shaft projects. The housing may also journal a counter-shaft 56 parallel to and spaced from the shaft 10 to which may be keyed a sprocket 57. A drive chain 58 passes around the sprockets 57 and 49 to establish a driving connection between the counter-shaft 56 and the hub 47 of the outer or ring gear of the secondary epicyclic gearing system.

A variable speed reaction-controlling unit is utilized, which may be of any form and which need not have the wide range or variability which has characterized the construction illustrated in Fig. 1. I have here shown this variable speed reaction control as constituting a cone pulley 60 keyed to the sleeve 40 at 61 and a cone pulley 62 keyed to the counter-shaft 56. A belt or like driving member 63 is adjustably mounted upon the cone pulley 60, 62 and has associated therewith a combined belt shifter and belt tightener mechanism, best illustrated in Fig. 4. This belt tightener and belt shifter mechanism includes an idler 64 journaled upon an arm 65 of an L-shaped member whose opposite end portion 66 is pivoted at 67 to a carrier arm 68. The carrier arm 68 has an angularly bent terminal portion 69 spaced from the pivot 67 and a coil spring 70 is interposed between the arms 66 and 69. A portion 71 of the carrier extends from the carrier arm 68 in substantially perpendicular relation, and a coil spring 72 is interposed between the same and the arm 66. The carrier is bent substantially perpendicular from the part 71 thereof at 73, and the free end thereof is pivoted at 74 to a shaft 75 extending substantially parallel to the shafts 10 and 56. An abutment surface 76 on the carrier is positioned adjacent to but normally spaced from the shaft 10 by a coil spring 77. The shaft 75 is provided with means (not shown) to move it axially for the purpose of shifting the belt.

This embodiment of the invention reduces the range of variability required in the variable control mechanism without increasing the torque reaction applied to that mechanism. In fact, the device reduces the torque reaction pressure applied to the variable control as compared to that applied to the variable control in the Fig. 1 embodiment without increasing the speed of revolution of the primary sun gear. This results from the torque dividing and equalizing effect of the secondary planet gear.

In this device the primary torque reaction is divided or directed into two paths. One reaction is in the nature of regenerative power applied from the secondary sun gear 50 to the output ring gear 21. The other path of reaction is a secondary reaction controlled by the variable control mechanism and its connection with the secondary ring gear 45.

At very low output speeds, as in starting from neutral, the primary reaction torque pressure offered to the secondary epicyclic gearing system and to the variable control is small. As the transmission gradually comes to a direct drive, the reaction torque pressure gradually increases. The portion of the torque reaction pressure which is applied to the secondary epicyclic gearing and to the variable speed reaction control is divided between those parts so that the variable speed control device is called upon to withstand or take up a torque reaction small in comparison to that which it must take up in the Fig. 1 embodiment of this invention. When the device is in direct drive, the secondary gearing will be locked as a single unit by the variable control so that substantially all of the primary torque reaction will be applied to the output member and only a very small or negligible part of the primary torque reaction will be applied to the variable speed control.

One characteristic of this embodiment of the invention is that it has a high speed of rotation in the torque reaction path, and particularly in the secondary epicyclic gearing. This high speed operation continues only during operation of the device in neutral, and progressively decreases as the device operates and approaches a direct drive, at which the parts all revolve at the same speed. This embodiment of the invention also provides proper speed ratios in backlash decelerating effect.

The device requires comparatively high speed operation of the speed control at neutral setting as compared to the embodiment of Fig. 1, and an even higher speed for a reverse operation of the output shaft, and it is this increase in speed compared to the Fig. 1 device which permits the reduction of the torque reaction pressure applied to the control as compared to the torque reaction applied in the Fig. 1 embodiment. This same relation of the parts also provides for an overdriving relation, especially if the gear reduction at the rear axle of the motor vehicle employing the device is somewhat less than standard present practice.

In the operation of the device it will be apparent that, when the devise is starting from a stopped position, the rotation of drive shaft 10 will cause rotation of the planet carrier 16 and the planet gears 18 of the primary epicyclic gearing which tends to operate the sun gear 19 at a high speed. This speed is applied to the planet carrier 42 of the secondary epicyclic gearing which is converted into rotation of the outer ring gear 45 of the secondary gearing. The variable speed control mechanism, here shown as consisting of the cone pulleys 60 and 62, which also are driven from the sun gear 19 of the primary epicyclic gearing, absorb or take up a torque reaction. Thus, assuming that the belt 63 is normally positioned in a neutral setting, movement of the belt shifter toward the left will cause a reduction in the speed of rotation of the outer ring gear 45 of the secondary epicyclic gearing and, as this reduction occurs, an increase in the regenerative action applied at the secondary sun gear 50 will occur, which is in turn applied to the outer ring gear 21 of the primary gearing. This will result in a reduction of the speed of rotation of the secondary planet carrier 42 and of the sun gear 19, thus increasing the speed of the outer ring gear 21 of the epicyclic gearing. Consequently, the action in this embodiment of the invention is substantially the same as that illustrated in the Fig. 1 embodiment.

The belt shifting means perform the dual function of taking up slack on the belt and of adjusting the speed ratio. The parts are preferably arranged substantially as illustrated in Fig. 4 so that a substantial loop exists which is governed by the idler 64, and which provides an effective wrapping effect of the belt upon the pulleys. The spring 77 provides take-up and following action to maintain the belt tight. The springs 70, 72, coupled with the pivot mounting 67 for the arm which mounts the idler 64, accommodate the tilting of the belt as it is shifted from one position to another. Thus, when the belt shifter is adjusted to move the idler 64 toward the left, the spring 72 will be compressed, causing the idler 64 to tilt slightly around the center 67 in the clockwise direction. This is the direction which normally the belt will tend to tilt because of the shifting thereof axially in a direction toward the left. When the shifting movement has ended and the belt has found its proper position, then all of the parts will return to normal position with the idler 64 again assuming a position with its axis substantially parallel to the shaft 75 and to the shafts of the pulleys. Likewise, if the adjustment is toward the right, the spring 70 will be compressed and the arms 65 swung counterclockwise about the pivot center 67, which tilting is normal to an attempt to move the belt bodily in that direction. While this belt shifting means is preferred, any other belt shifting means found suitable may be employed.

It will also be understood that, while the single cone pulley type of variable speed drive is illustrated in Fig. 3, a multiple cone step pulley of the character illustrated in Fig. 1 may be employed, if desired.

Figure 6:
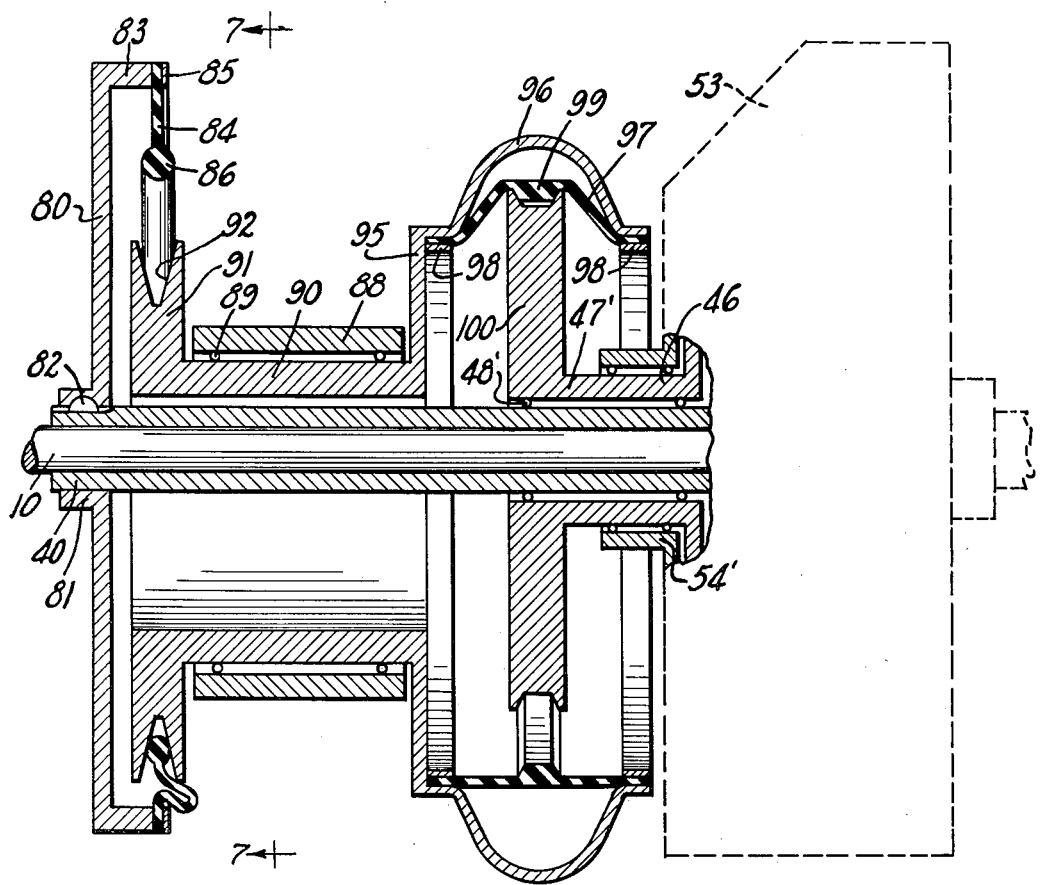
Fig. 6 is an axial sectional view similar to Fig. 5, but illustrating the parts in a different adjustment.
Figure 7:
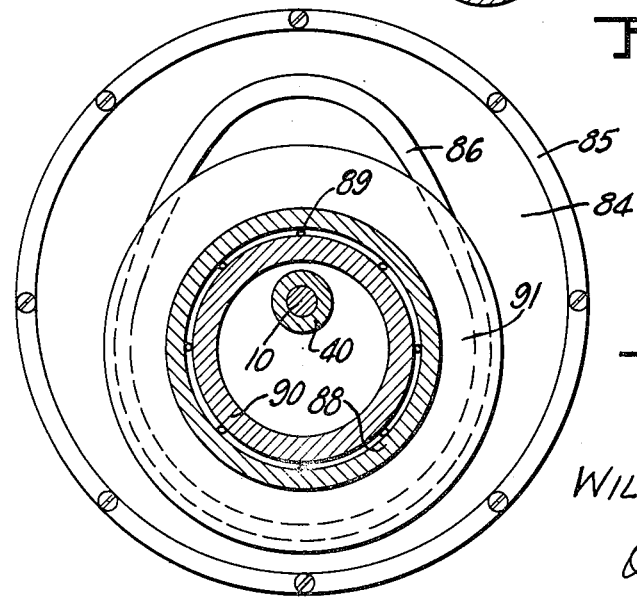
Fig. 7 is a transverse sectional view taken on line 7—7 of Fig. 6.

Still another type of variable speed control mechanism especially well suited for this invention is illustrated in Figs. 5 to 7. This is illustrated as being applied to a unit employing two epicyclic gear systems as illustrated in Fig. 3, and the same reference numerals used in connection therewith will apply here. The sleeve 40 forming the hub of the primary sun gear 19 is journaled to revolve relatively to the drive shaft 10 and projects from the gear housing 53. A rigid disk 80 is mounted upon the outer end of the sleeve 40 having a hub 81 which is keyed to said sleeve at 82. The disk 80 has a cylindrical flange 83 at its outer margin and an annular resilient member 84 is marginally secured to said flange as by a clamping ring 85. The annular resilient member 84 has a resilient inner rim portion or bead 86 of enlarged cross-sectional dimension.

An annular carrier 88, mounted adjustably for movement toward and from centered relation with the sleeve 40, has journaled therein, as by the bearings 89, a cylindrical member 90 having an internal bore much larger than the external cross-sectional diameter of the sleeve 40 which it encircles. Upon one end of the cylindrical member 90 is mounted a pulley flange 91 having a V-shaped peripheral pulley groove 92. The pulley 91, 92 is so proportioned in size to the size of the annular member 84 and its inner bead 86 that, when the parts are concentric as illustrated in Fig. 5, the bead 86 will have a wedged continuous frictional driving engagement in the pulley groove 92. When the member 88 is shifted to move the cylinder 90 and the pulley 91, 92 into off-center relation with respect to the sleeve 40 and the remaining parts, the resilient member 84, which preferably is formed of natural rubber or synthetic rubber, will be stretched as illustrated in Fig. 7, so that the pulley 91, 92 will be caused to operate at a greater speed than the sleeve 40, the disk 80 and the resilient ring 84.

The cylindrical member 90 fixedly mounts at the end thereof opposite the pulley 91 and between its carrier 88 and the gear housing 53, a circular housing part, here illustrated as consisting of the outwardly projecting wall portion 95, and a marginal portion 96 of arched axial cross-sectional shape. A cylindrical resilient member 97 is anchored at its opposite ends at 98 to the longitudinally spaced parts of the member 96, whereby its central portion is normally spaced inwardly from the crown or central portion of the member 96. The cylindrical resilient member 97 will preferably be provided with a central circumferential internal projecting part or rib 99 which may be of any suitable cross-sectional shape, being illustrated in Fig. 5 as of part-circular cross-section and being illustrated in Fig. 6 as of comparatively flat cross-section. A pulley member 100 has an external circumferential configuration to receive the circumferential rib 99, which preferably constrictively fits thereon to provide a direct drive relation between the parts when the member 88 is positioned concentrically of the sleeve 40 as illustrated in Fig. 5. The pulley member 100 is mounted upon the hub portion 47' of the carrier 46 for the outer ring gear of the secondary epicyclic gearing of the gearing unit, being journaled externally upon the sleeve 40 by means of bearing 48', said sleeve 47' projecting externally from the housing 53. The housing 53 will be provided with a journal 54' which encircles the hub portion 47'.

It will be apparent that the movement of the members 88 and 90 between concentric and eccentric relation with reference to the sleeve 40 will change the driving relation between the resilient rib 99 and the pulley 100, and between the bead 86 and the pulley 91, 92, as illustrated in Figs. 5 and 6. Thus, when the parts are arranged concentrically in full peripheral contact, a one-to-one drive ratio will exist between the parts 99 and 100 and between the parts 84 and 91. As soon, however, as the parts 88 and 90 are moved off-center with respect to the sleeve 40, the resilient members 84 and 97 are distorted and stretched as illustrated in Fig. 6, and their respective contacts with their pulleys are limited to a partial peripheral contact only. This contact is substantially the same at the two pulleys 91 and 100, but the frictional driving contacts at said pulleys are located diametrically oppositely, as best seen in Fig. 6. In the neutral drive position of the mechanism, the parts 88 and 90 will be positioned off-center with reference to the sleeve 40. When the parts are in direct drive, the parts 88 and 90 will be concentric with the sleeve 40, as illustrated in Fig. 5. When a reverse drive is desired, the off-center relation relative to the parts 88 and 90 relative to the hub 40 will be increased greater than the eccentricity of said parts for the neutral adjustment.

It will be understood that the Fig. 6 adjustment of the parts is extreme and beyond that which normally would be required for operative neutral setting of the mechanism. One feature illustrated in Fig. 6 is to be observed, however, and that is that the stretching of the member 84 by the pulley 91 entails a reduction of the cross-sectional dimension of the bead 86. The normal cross-section of the bead 86 is preferably slightly greater than the width of the mouth of the tapered groove 92 so that it has a wedge fit in said groove. As the bead is stretched and its cross-section is reduced, it will sink deeper into the tapered groove 92. The decrease in cross-section of the bead and the sinking of the bead deeper into the groove supplements the speed changing action resulting from the eccentric movement of the parts so that a small amount of eccentricity between the parts 88 and 40 will produce a substantial change in the speed ratio. The speed change will, of course, essentially result from the fact that the stretching of the member 84 increases the length of the inner periphery of said member at the bend 86. The same result occurs when the pulley 100 moves to an eccentric position with respect to the circumferential resilient rib 99.

Referring now to the embodiment of the invention illustrated in Fig. 8, an automatic control of the transmission mechanism through the use of variable speed adjusting means of the type illustrated in Figs. 5 to 7 is provided. In this arrangement of the parts where only a portion of the speed adjusting means is illustrated, the cylindrical control member 88 is illustrated as being provided with a projecting ear 105 which is pivoted at 106 to a support 107. Another projection 108, preferably substantially diametrically opposed to the ear 105, has connected thereto a spring 109 extending to a fixed part 110 normally urging or swinging the device into eccentric relation to the sleeve 40. The support 110 may include a part 111 apertured to slidably receive the shank 112 of a bolt having an enlarged head 113 pressed into engagement with the extension 108 by a coil spring 114 encircling the shank 112 and bearing at its ends against the support 111 and the head 113. A nut 115 mounted upon the shank 112 limits the upward movement of the shank 112. The spring 114 is preferably stronger than the spring 109 so that the spring 109 acts only to move the part 108 into contact with the head 113. The parts are preferably so adjusted that when the arm 108 bears upon the head 113, the eccentricity of the parts 88 and 90 with respect to the sleeve 40 and the shaft 10 will produce a neutral driving relation of the transmission.

The arm 108 of the adjusting member 88 is connected as by a link 118 with the stem 119 of a piston 120. The piston 120 is mounted in the cylinder 121, having a line 122 connected at one end thereof and a line 123 connected at the other end thereof. The arrangement is such that the piston 120 becomes a double acting unit. The line 122 leads to a pressure regulating valve 124, having a shiftable adjustment or control member 125 which is engaged by a cam portion 126 of a bellcrank member pivoted at 127 to the valve casing or other suitable support and including an arm 128. A link 129 connects the end of the bellcrank 128 with the arm 130 pivoted to a support 131 and controlled by a speed responsive governor unit 132 which may be of any construction desired. The valve 124 is interposed in a line 135, and this line and the line 123 lead to a valve 136 which is manually adjustable so as to selectively connect one of the two lines 123 and 135 in communication with a line 137. The line 137 leads to an intake manifold 138 and has a valve 139 interposed therein. The valve casing has a vent port 140 and a valve element has a passage 141 therein adapted to selectively position the right end portion of the conduit 137 in communication with the vent part 140, as shown in full lines, or to establish communication between the opposite parts of the line 137, as shown in dotted lines. The valve element is controlled through a link 143 with the accelerator pedal 144.

In the normal operation of the device the valve 136 will be set so that lines 122 and 135 communicate with the conduit 137 leading to the intake manifold. Whenever the engine is idling, the spring 109 will urge the arm 108 and the control member 88 to a neutral position eccentric of the drive shaft 10 and the sleeve 40. Thereupon, as the accelerator 144 is depressed, the connection of the valve 139 therewith through the lever 142 and the link 143 will shift that valve to the dotted line position, placing the two parts of the line 137 in communication. As the suction in the intake manifold increases, that suction will act through the lines 137, 135 and 122 to produce in the cylinder 121 a suction in the upper chamber acting to pull the piston 120 upwardly. The connection of this piston 120 with the arm 108 thus serves to pull the arm against the spring 109 and in a direction tending to move the member 88 into centered relation to the sleeve 40. Inasmuch as the characteristic of an internal combustion engine is such that whenever it is accelerated or is placed under heavy load the vacuum is light, it will be apparent that the vacuum available to shift the member 88 toward direct drive relation will be small upon starting, upon accelerating or when climbing a hill. During these times the speed ratio will be low and the speed ratio between the driving and driven shafts will be great. As the load on the engine is reduced and as the vehicle comes up to a speed, the vacuum in the intake manifold will increase and will act to pull the transmission toward a centered direct drive position. The parts will preferably be so arranged that a direct drive relation or an overdrive relation will occur when the suction of the engine intake manifold has reached a maximum. In the preferred arrangement of the parts, a vacuum of eight inches of mercury or more will be sufficient to pull the transmission into direct drive so that a light acceleration or the climbing of a slight grade will not cause a reduction in the speed of the output shaft 12.

The valve 124 and its control governor 132 are optional and, where used, are employed primarily to secure response to engine speed in connection with a device in a vehicle having an overdrive. In other words, the valve may be employed to control the vacuum in the cylinder 121 in response to the speed of operation of the vehicle.

In the event it is desired to reverse the drive, the valve 136 is manually adjusted so that the conduit 123 is connected with the conduit 137 leading to the intake manifold. In this adjustment the suction acts downwardly in the cylinder 121 to push the piston 120 downwardly, thereby supplementing the action of the sping 109 and acting against the spring 114. This serves to swing the control parts 88 and 90 to a greater eccentricity than that applying for the neutral setting of the parts and produces an increase in speed which results in a reverse rotation of the output shaft, as explained above.

Another embodiment of the invention is illustrated in Fig. 9. In this embodiment of the invention, the hub 47 of the outer ring gear of the secondary epicyclic gearing mounts a plain pulley 150 over which runs a belt 151 which also is trained around a split V-pulley 152 mounted upon the countershaft 56. The split conical pulley 152 is of known type, having a spring 153 associated therewith and serving normally to urge the parts of the split pulley toward each other and thereby provide a large diameter circumference for engagement with the V-belt 151, but yieldable under pressure to separate its parts, whereby the belt 151 engages a smaller diameter portion of said pulley. A spring pressed belt tightener having an idler pulley 154 engages the belt and takes up the slack incident to spreading of the parts of the V-pulley 152. The belt tightener 154 includes a part 155 pivoted at 156 intermediate the ends of a lever 157. One end of the lever 157 is connected at 158 to the shiftable section 159 of the separable V-pulley 152. The other end of the link is pivoted at 160 to the stem 161 of a piston 162 mounted within the cylinder 163. The piston stem 161 is preferably provided with a shoulder 164 external of the cylinder 163 and is encircled by a coil spring 165 whose opposite ends bear against the end of the cylinder 163 and the shoulder 164 to normally urge the piston 162 toward the right as viewed in Fig. 9.

The cylinder 163 has connection by a conduit 166 with a valve 167 having a vent port 168 and a valve element operated by a lever 169. The valve controls communication of the line 166 either with atmosphere through the vent port 168 or with line 170 leading to the intake manifold 171 of the internal combustion engine. The lever 169 of the valve is connected by a link 172 with an accelerator pedal 173.

In Fig. 9 the device is illustrated in its idling position and it will be apparent that the bore of the valve 167 is in communication with atmosphere at the valve vent 168. Upon depression of the accelerator pedal 173, the valve 167 is adjusted to establish communication between the conduits 166 and 170, thereby applying the suction in the intake manifold to the cylinder 163 so that it acts in opposition to the spring 165 to move the piston 162 toward the left. Movement of the piston 162 toward the left swings the lever 157 in a manner to permit the shiftable part 159 of separable V-pulley to move toward the right, thereby reducing the speed ratio between the countershaft 56 and the pulley 150, and the parts are so arranged that when the suction in the intake manifold reaches a predetermined value depending upon the load on the engine, the device will be permitted to move into a direct drive relation. If the load on the engine increases to such an extent that the suction drops, the springs 165 and 163 will thereupon act to separate the parts of the separable pulley 152 and increase the speed ratio toward that which is required for neutral operation of the gearing.

In this construction a separate control is provided for reverse operation and is here shown as a pedal 175 to which is pivoted a link 176 which has a pivotal connection at 177 with the lever 157 between the point 156 and 158 thereof. With this arrangement, depression of the pedal 175 will swing the lever 157 in a direction to increase the separation of the parts of the pulley 152, thereby increasing the speed ratio above that required for neutral operation and causing the gearing within the casing 53 to operate to produce reverse rotation of the output shaft 12.

The various embodiments of the invention which have been here illustrated, while illustrative of the invention, are not intended to be limiting, and it is contemplated that the invention may be embodied in other forms within the scope of the appended claims without departing from the spirit of the invention.

I claim:

1. A power transmission comprising a primary epicyclic gearing unit; a secondary epicyclic gearing unit; each of said units including a rotary carrier, a planet gear journaled on said carrier, a sun gear meshing with said planet gear and a ring gear meshing with said planet gear; a drive shaft driving said primary planet carrier; an output shaft driven by said primary ring gear; said primary sun gear and secondary planet carrier being fixedly connected together; said primary ring gear and secondary sun gear being fixedly connected together; and means for controlling the speed ratio between said secondary planet carrier and said secondary ring gear.

2. A power transmission comprising two differential gearing systems, each system including a rotary carrier, a planet gear on said carrier, a sun gear and a ring gear, the planet gear of each system meshing with the sun gear and ring gear of said system, a drive shaft actuating the carrier of a first system, a driven shaft actuated by the ring gear of said first system, the sun gear of said first system being connected to the carrier of the second system, the ring gear of said first system being connected to the sun gear of the second system, and means for varying the speed ratio between planet carrier and ring gear of said second system.

3. A power transmission connecting a driving and a driven shaft, comprising a differential gear system having an output gear connected to said driven shaft, a torque reaction gear, a torque dividing gear meshing with said first named gears and a rotatable carrier journaling said torque dividing gear and connected to said drive shaft; a second differential gear system having an output gear connected to said first output gear, a torque reaction gear, a torque dividing gear meshing with the first named gears of said second system and a rotatable carrier journaling said torque dividing gear and actuated by the torque reaction gear of said first system; and variable speed means for controlling the speed ratio between said torque reaction gears.

4. A power transmission connecting a driving and a driven shaft, comprising a differential gear system having an output gear connected to said driven shaft, a torque reaction gear, a torque dividing gear meshing with said first named gears and a rotatable carrier journaling said torque dividing gear and connected to said drive shaft; a second differential gear system having an output gear connected to said first output gear, a torque reaction gear, a torque dividing gear meshing with the first named gears of said second system and a rotable carrier journaling said torque dividing gear and actuated by the torque reaction gear of said first system; and variable speed means for controlling the speed ratio between said torque reaction gears, said gear systems being planetary, the output of said primary system being a ring gear and the output of said secondary system being a sun gear, the torque reaction gear of said first system being a sun gear and the torque reaction gear of said second system being a ring gear.

5. A power transmission connecting a driving and a driven shaft, comprising a differential gear system having an output gear connected to said driven shaft, a torque reaction gear, a torque dividing gear meshing with said first named gears and a rotatable carrier journaling said torque dividing gear and actuated by said drive shaft; a second differential gear system having an output gear connected to said first output gear, a torque reaction gear, a torque dividing gear meshing with the first named gears of said second system and a rotatable carrier journaling said torque dividing gear and actuated by the torque reaction gear of said first system; and variable speed means driven by the torque reaction gear of said first system for controlling the rotative speed of the torque reaction gear of said second system.

6. A power transmission device for connecting the driving and driven shafts of a machine powered by an internal combustion engine having an intake manifold, comprising a differential gear system including an output gear, a torque reaction gear and a bodily shiftable and rotatable input gear meshing with said first named gears; a variable speed mechanism for controlling the speed of said torque reaction gear and having a neutral position, a low speed direct drive range of operating positions and a high speed reverse drive range of operating positions, means for progressively and selectively positioning said mechanism in said direct drive range in response to variation in intake manifold vacuum, and manually actuable means for adjusting said variable speed mechanism in said reverse drive range.

7. A power transmission device for connecting the driving and driven shafts of a machine powered by an internal combustion engine having an intake manifold, comprising a differential gear system including an output gear, a torque reaction gear and a bodily shiftable and rotatable input gear meshing with said first named gears; a variable speed mechanism for controlling the speed of said torque reaction gear and having a neutral position, a low speed direct drive position and a high speed reverse drive position, said mechanism being progressively and selectively positionable in the range between said positions; means responsive to the suction in said manifold and operative to regulate said variable speed mechanism; and selectively positionable means for controlling said regulating means, said last named means having one position for regulating said variable speed mechanism in the range between neutral and direct drive and a second position for regulating said variable speed mechanism in the high speed reverse drive range.

8. A power transmission device for connecting the driving and driven shafts of a machine powered by an internal combustion engine having an intake manifold, comprising a differential gear system including an output gear, a torque reaction gear and a bodily shiftable and rotatable input gear meshing with said first named gears; a variable speed mechanism for controlling the speed of said torque reaction gear and having a neutral position, a low speed direct drive position and a high speed reverse drive position, said mechanism being progressively and selectively positionable in the range between said positions; and means responsive to the suction in said manifold to regulate said variable speed mechanism including a double acting fluid pressure responsive power member, a pair of lines connecting said power member and manifold, and valve means for opening a selected one only of said lines.

9. A power transmission device for connecting the driving and driven shafts of a machine powdered by an internal combustion engine having an intake manifold and a shiftable throttle, comprising an epicyclic gear system including a torque reaction gear, a variable speed mechanism for controlling the operating speed of said torque reaction gear and the speed ratio between said driving and driven shafts, a suction powered member connected to said manifold for controlling said variable speed mechanism, and a control valve for said suction powered member, said control valve being connected with said throttle, said suction powered member being double acting and having two fluid pressure lines, and a reversing valve for selectively opening one only of said lines for communication between said manifold and suction powered member.

10. A power transmission device for connecting the driving and driven shafts of a machine powered by an internal combustion engine having an intake manifold and a shiftable throttle, comprising an epicyclic gear system including a torque reaction gear, a variable speed mechanism for controlling the operating speed of said torque reaction gear and the speed ratio between said driving and driven shafts, a suction powered member connected to said manifold for controlling said variable speed mechanism, and a control valve for said suction powered member, said control valve being connected with said throttle, and manually actuated selective means for controlling the direction of actuation of said variable speed mechanism by said suction powered member as between forward drive and reverse drive.

11. A power transmission of the character defined in claim 3, wherein said driving shaft is powered by an internal combustion engine having an intake manifold, and mechanism responsive to the suction of said intake manifold for regulating said variable speed means.

12. A power transmission of the character defined in claim 3, wherein said driving shaft is powered by an internal combustion engine having an intake manifold, and means for regulating said variable speed means including a pressure responsive member connected to actuate said variable speed mechanism, a conduit connecting said pressure responsive member and manifold, and a valve in said conduit.

13. A power transmission of the character defined in claim 3, wherein said driving shaft is powered by an internal combustion engine having an intake manifold and a throttle, mechanism responsive to the suction of said intake manifold for controlling said variable speed mechanism, and a control valve for said last named mechanism, said valve being connected with said throttle.

References Cited in the file of this patent

UNITED STATES PATENTS

| 1,362,655 | West | Dec. 21, 1920 |
| 1,748,683 | Stewart | Feb. 25, 1930 |
| 1,957,578 | Cook | May 8, 1934 |
| 1,961,619 | McClain | June 5, 1934 |
| 2,008,869 | Leoni | July 23, 1935 |
| 2,150,456 | Perrine | Mar. 14, 1939 |
| 2,164,818 | Heyer | July 4, 1939 |
| 2,187,737 | Gregory | Jan. 23, 1940 |
| 2,242,519 | Frank | May 20, 1941 |
| 2,278,351 | Havens | Mar. 31, 1942 |
| 2,364,448 | Jandasek | Dec. 5, 1944 |
| 2,441,276 | Kuner | May 11, 1948 |
| 2,467,226 | Place | Apr. 12, 1949 |
| 2,564,393 | Clancy | Aug. 14, 1951 |
| 2,565,214 | Flinn | Aug. 21, 1951 |
| 2,575,884 | Mayrath | Nov. 20, 1951 |

FOREIGN PATENTS

| 539,362 | France | June 24, 1922 |